Nov. 30, 1943.                W. J. KONVALINKA                2,335,771
              METHOD OF CALIBRATING INDICATING INSTRUMENTS
                        Filed April 29, 1942
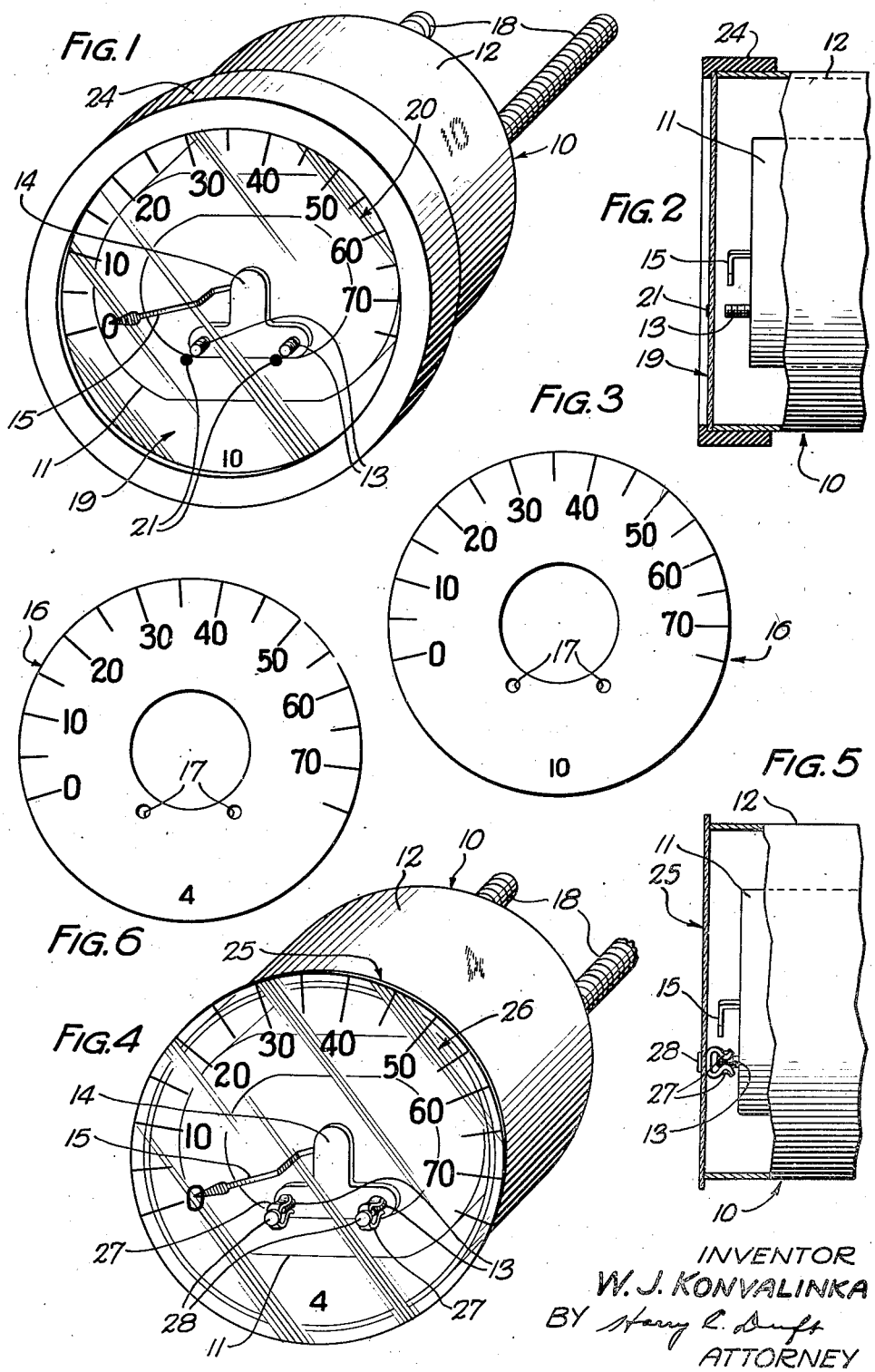
INVENTOR
W. J. KONVALINKA
BY Harry C. Duft
ATTORNEY Patented Nov. 30, 1943

2,335,771

UNITED STATES PATENT OFFICE 2,335,771

METHOD OF CALIBRATING INDICATING INSTRUMENTS

William J. Konvalinka, Downers Grove, Ill., assignor to Western Electric Company, Incorporated, New York, N. Y., a corporation of New York Application April 29, 1942, Serial No. 440,962

3 Claims. (Cl. 73—151)

This invention relates to a method of calibrating indicating instruments and more particularly to a method of calibrating electric meters.

In the manufacture of indicating instruments employing pointers and scales or dials, it is difficult to manufacture such instruments so accurately that they will have the same amount of deflection of the pointer for a given pressure, current or voltage. These variations in deflection are somewhat definite and it has been found that by providing a plurality of differently graduated instrument dials, one of them will be found suited for practically any instrument of a similar type. However, certain difficulties are encountered in selecting the correct dial for the instrument during which it may be necessary to mount several of the instrument dials individually in correct position on the instrument with mounting screws on the instrument entered in apertures in the dials, the instrument being tested after each dial mounting to check the indication. Also, in mounting the dials in position, they have to be positioned in some cases under the delicately mounted pointers with great care to prevent damage thereto. The instrument dials are also liable to damage during the selection and mounting of the proper one.

An object of the invention is to provide a simple and efficient method of calibrating indicating instruments.

In accordance with one embodiment of the invention, as used for determining scale or dial characteristics of electric meters, there is provided a set of differently graduated master dials each comprising a transparent base member carried in a mounting cap which fits over a magnet assembly shield in a manner similar to that of an outer meter case in the finally assembled meter. Each master dial has two similarly arranged dark spots representing dial apertures through which the mounting screws are passed. The cap carrying the master dial is rotated on the shield until the dark spots are accurately aligned with the dial mounting screws. Thereafter, several different known current values are passed through the meter and if the particular dial is not suited, another cap carrying a different master dial is substituted and this continues until the correct one for the particular characteristics of the meter is found. Each of the master dials is provided with a number and when the correct dial is found, the meter is marked for the particular instrument dial number it is to be finally supplied with, which latter dials are correspondingly numbered.

A complete understanding of the invention may be had by reference to the accompanying drawing, in which Fig. 1 is an isometric view of an indicating instrument having a transparent master dial mounted thereon which is used in practicing the method of the invention;

Fig. 2 is a fragmentary side view, partly in section, of the assemblage shown in Fig. 1;

Fig. 3 is an elevational view of a dial calibrated similar to the master dial shown in Fig. 1 and having a corresponding identifying number;

Fig. 4 is an isometric view of another embodiment of a master dial mounted on an indicating instrument;

Fig. 5 is a fragmentary side view, partly in section, of the assemblage shown in Fig. 4, and Fig. 6 is an elevational view of a dial calibrated similar to the master dial shown in Fig. 4 and having a corresponding identifying number.

In the drawing, the novel features of the invention are shown applied to electric meters indicated, in general at 10 (Figs. 1 and 4). The illustrated meter 10 includes a magnet assembly 11, a surrounding shield 12 and screws 13 fixed to the magnet assembly. The screws 13 serve to support a bridge piece 14 for the meter movement which includes a pointer 15 and also serve as means for positioning and mounting a graduated dial 16 of the type to be assembled on the meter (Figs. 3 and 6), the dial being formed with two apertures 17 for receiving the outer ends of the screws. Meter mounting and terminal members are indicated at 18.

In practicing the invention, a set of transparent master dials comprising, for example, ten, are provided. Each dial of the set, one of which is indicated at 19 (Figs. 1 and 2) comprises a transparent base member, which may be of Celluloid or other transparent material of a suitable thickness to provide a desired stiffness and is provided with a set of graduations 20, the graduations differing on each of the dials of the set to meet somewhat definite variations in the characteristics of the particular meter. It is to be understood that a plurality of dials 16 of the type to be assembled on the meter are produced having graduations arranged to correspond to the graduations 20 on the different master dials 19 and the dials 16 and 19, which have similar graduations, have corresponding numbers, as indicated, for example, by the number 10 (Figs. 1 and 3). Also provided on each master dial 19 are two similarly arranged black spots 21, which represent the apertures 17 (Figs. 3 and 6) provided in the dial 16, which is finally selected and assembled on the meter. The master dials 19 are each fixed in an internally shouldered ring or cap 24 having an internal diameter which permits the assemblage to be freely mounted and rotatably adjusted on the magnet assembly shield 12, as shown in Fig. 2.

Another set of transparent master dials is shown in Figs. 4 and 5, wherein one of the dials of the set is indicated at 25. The set of dials 25 is provided with different graduations 26 corresponding to the different graduations 20 of the previously described set of master dials 19. For mounting and holding the dials 25 on the meter, each dial is equipped, at its rear face, with a set of similarly arranged yieldable clips 27, having head portions 28 arranged on the front face of the dial which represent the apertures 17 (Figs. 3 and 6) provided in the dial 16, which is finally selected and assembled on the meter. The clips 27 are arranged on centers similar to the mounting screws 13 of the meter and adapted to fit over the same and thus serve to predeterminedly position and hold the dial 25 against the forward edge of the magnet assembly shield 12, as shown in Fig. 5. The dials 25 and 16, which have similar graduations, have corresponding numbers, as indicated, for example by the number 4 (Figs. 4 and 6).

To produce the master dials 19 and 25, a set of differently graduated dials is first laid out by hand and then photographed on a transparent film having a photo-sensitive face. From the negative photographic film or plate a positive film is made also on a transparent base which is then cut up to produce the master dials 19 and 25. The dials 16 are photographic prints made from the negative film or plate.

In practicing the method of calibrating indicating instruments and using the set of transparent master dials 19 to determine the scale or dial characteristics of a meter, one of the master dial assemblages is selected, which, from experience, is most likely to suit the particular meter and mounted on the magnet assembly shield 12 in the manner shown in Fig. 2. The cap 24 of the assemblage is then rotated until the two black spots 21 on the dial are accurately aligned with the mounting screws 13 of the meter, which are visible through the dial, as shown in Fig. 1. Thereafter, the meter terminal members 18 are connected to a suitable test circuit, which includes a master meter (not shown) and several different known current values are passed through the meter under test and if the desired scale characteristics indicated are not within tolerable limits, another differently graduated master dial assemblage is mounted on the meter and the testing operations repeated and this may be repeated again and again until the correct dial for the particular characteristics of the meter is found. The operator then marks the meter by inscribing on the magnet assembly shield 12 the number corresponding to that of the correct master dial, as indicated by the numeral 10, on the shield (Fig. 1). The meter thus numbered will finally be supplied with an instrument dial 16 numbered 10, which, as hereinbefore described, is provided with graduations 20 similar to those of the master dial 19.

The use of the alternative set of transparent master dials 25 to select a meter dial 16 is similar to that of the master dials 19 except in the manner of mounting them on the meter, as hereinbefore described.

From the foregoing description, it will be apparent that a simple and efficient method of calibrating indicating instruments is provided which is capable of being expeditiously used in determining scale or dial characteristics of indicating instruments and without damaging the instrument or the dial to be used therewith.

While the features of this invention have been described for determining dial characteristics of electric meters, it should be understood that modifications can be made and it is capable of other applications.

What is claimed is:

1. A method of calibrating indicating instruments employing dials and pointers which comprises selecting a dial from a set of predeterminedly graduated transparent master dials, mounting the selected dial on the instrument in front of the pointer with indications on the dial in alignment with fixed points of the instrument visible through the dial without disturbing any part of the instrument, subjecting the instrument to several different known conditions to which the instrument is responsive and noting whether the registrations of the pointer with the graduations of the selected dial are within tolerable limits to select a dial which meets the particular dial characteristics of the instrument, removing the master dial from the instrument, and then substituting therefor a correspondingly graduated instrument dial.

2. A method of calibrating indicating instruments employing dials and pointers which comprises selecting a dial from a set of differently graduated transparent master dials, rotatably mounting the selected master dial on the instrument in front of the pointer and rotatably aligning indicators on the dial with fixed points of the instrument visible through the dial without disturbing any part of the instrument, subjecting the instrument to several different known conditions to which the instrument is responsive and noting whether the registrations of the pointer with the graduations of the selected dial are within tolerable limits to determine if the selected dial meets the particular dial characteristics of the instrument, removing the master dial from the instrument, and, when a suitable master dial is found, substituting therefor a correspondingly graduated instrument dial.

3. A method of calibrating electric meters employing dials and pointers which comprises selecting a dial from a set of differently graduated transparent master dials having different identifying symbols, mounting the selected dial on the meter in front of the pointer with indicators on the dial in alignment with fixed points of the meter visible through the dial without disturbing any part of the meter, subjecting the meter to several different known current values to which the meter is responsive and noting whether the registrations of the pointer with the graduations of the selected dial are within tolerable limits to determine if the selected dial meets the particular dial characteristics of the meter, removing the master dial from the meter, and, when a suitable master dial is found, substituting therefor a meter dial having a corresponding identifying symbol and graduation.

WILLIAM J. KONVALINKA.